(12) United States Patent
Shimizu

(10) Patent No.: US 7,898,751 B2
(45) Date of Patent: Mar. 1, 2011

(54) PROJECTION LENS UNIT AND MANUFACTURING METHOD OF PROJECTION LENS UNIT

(75) Inventor: Hitoshi Shimizu, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 16 days.

(21) Appl. No.: 12/109,235

(22) Filed: Apr. 24, 2008

(65) Prior Publication Data

US 2008/0278832 A1 Nov. 13, 2008

(30) Foreign Application Priority Data

Apr. 26, 2007 (JP) .......................... P2007-117009

(51) Int. Cl.
*G02B 7/02* (2006.01)

(52) U.S. Cl. .................. 359/819; 359/649; 359/808; 359/811

(58) Field of Classification Search .................. 359/819
See application file for complete search history.

(56) References Cited

U.S. PATENT DOCUMENTS

| | | | | |
|---|---|---|---|---|
| 4,433,897 A | * | 2/1984 | Kojima et al. ............... | 359/830 |
| 4,737,017 A | * | 4/1988 | Nagasaka .................... | 359/811 |
| 5,969,887 A | * | 10/1999 | Hagimori et al. ............ | 359/819 |
| 6,922,295 B2 | * | 7/2005 | Glassburn et al. ........... | 359/819 |
| 7,187,508 B2 | * | 3/2007 | Chiang ........................ | 359/822 |
| 2004/0223074 A1 | * | 11/2004 | Takada ........................ | 348/360 |

FOREIGN PATENT DOCUMENTS

| | | |
|---|---|---|
| GB | 2343966 A | 5/2000 |
| JP | 2000-187274 A | 7/2000 |
| JP | 2003-114479 A | 4/2003 |

* cited by examiner

*Primary Examiner*—Jessica T Stultz
(74) *Attorney, Agent, or Firm*—Birch, Stewart, Kolasch & Birch, LLP

(57) ABSTRACT

A projection lens unit includes a magnifying optical system is provided. A second magnifying lens barrel has a shape of double circular cylinders, and a first magnifying lens barrel is fitted to an outer circular cylinder. Further, a second magnifying lens is in contact with and fixed to a step portion of inner circular cylinder. In a manufacturing step thereof, the second magnifying lens is inserted into the inner circular cylinder of the second magnifying lens barrel to be into contact with the step portion. A front end portion of the inner circular cylinder is plastically deformed by being heated and pressed to fix the second magnifying lens. An outer peripheral edge of the front end portion has a curved surface. The curved surface of the front end portion is made to be smaller in radius of curvature than the second magnifying lens.

5 Claims, 3 Drawing Sheets

RELATED ART

PROJECTION LENS UNIT AND MANUFACTURING METHOD OF PROJECTION LENS UNIT

CROSS-REFERENCE TO RELATED APPLICATIONS

This application is based on and claims priority under 35 USC 119 from Japanese Patent Application No. 2007-117009 filed Apr. 26, 2007.

BACKGROUND

1. Technical Field

The present invention relates to a projection lens unit employed in a rear projection device, a front projection apparatus or the like and a manufacturing method of the projection lens unit.

2. Related Art

A rear projection television (RPTV) having a projection unit which is placed on a rear side of a large screen and projects an image to the large screen (refer to, for example, JP-A-2003-114479) is known. Recently, thin-screen television having a large screen such as a plasma display television, a liquid crystal television have been spread, also RPTV which is more inexpensive than the plasma display television and the liquid crystal television still has a strong demand.

Although RPTV is provided with a projection unit on a rear side of the screen thereof, and therefore, RPTV needs some degree of thickness. But it has been proposed that RPTV employs a refractive optical system so as to be in a thinner shape (refer to, for example, JP-A-2000-187274 (corresponding to GB-A-2343966)). The refractive optical system employed by RPTV includes a convergent optical system that converges image light for refracting the image light, a mirror that reflects the converged image light, and a magnifying optical system that magnifies the converged image light after reflecting the converged light. The magnifying optical system includes plural lenses, the image light is magnified at each time of transmitting through each lens. In order to deal with magnified image light, according to the lens constituting the magnifying optical system, the nearer lens is arranged to the screen side, the larger the diameter of lens is.

However, according to the magnifying optical system, as shown by FIG. 3, there poses a problem that ghost is generated by image light reflected without transmitting through a first lens 101 being further reflected by a lens holding frame 103 holding a second lens 102 which is next to the first lens 101.

The invention resolves the problem and an object of the invention is to provide a projection lens unit for preventing ghost from being generated caused by a lens holding frame that holds a lens constituting a magnifying optical system, and a manufacturing method of the projection lens.

SUMMARY

[1] According to an aspect of the invention, A projection lens unit includes in order from a screen side, a first lens and second lens. The second lens is smaller in diameter than the first lens. The second lens is held by an inner peripheral surface of a lens holding frame which has a shape of a circular cylinder at a peripheral edge thereof. An outer peripheral edge of an end portion of the lens holding frame on the screen side has a convex curved shape being smaller in radius of curvature than a screen-side surface of the second lens.

[2] According to the projection lens unit of [1], the convex curved surface may be equal to or smaller than ⅓ in radius of curvature than the screen-side surface of the second lens.

[3] According to the projection lens unit of [1] or [2], the end portion of the lens holding frame may have a rough surface.

[4] According to the projection lens unit of [1], [2] or [3], the end portion of the lens holding frame is a caulking portion that is plastically deformed by heat and pressure so that the caulking portion caulks the second lens.

[5] According to another aspect of the invention, a manufacturing method of a projection lens unit which comprises in order from a screen side, a first lens and a second lens smaller in diameter than the first lens, the second lens being held by an inner peripheral surface of a lens holding frame which has a shape of a circular cylinder at a peripheral edge, the fabrication method includes: deforming plastically an end portion of the lens holding unit by heat and pressure so that the end portion caulks the second lens, and an outer peripheral edge of the end portion has a convex curved shape being smaller in radius of curvature than a screen-side surface of the second lens.

According to the projection lens unit and the manufacturing method of the invention, the outer peripheral edge of the end portion of the lens holding frame holding the second lens has the convex curved surface being smaller in radius of curvature than the screen-side second lens, and therefore, image light reflected without transmitting through the first lens arranged on the screen side does not transmit through the first lens by further being reflected by the lens holding frame holding the second lens. Thereby, ghost can be prevented from being generated.

Further, the end portion of the lens holding frame that holds the second lens is the caulking portion that is deformed plastically deformed by heat and pressure so that the caulking portion caulks the second lens, and therefore, the end portion can easily be constituted by the shape of the curved surface. Further, the shape of the curved surface can simply be changed.

DETAILED DESCRIPTION

Figure 1:
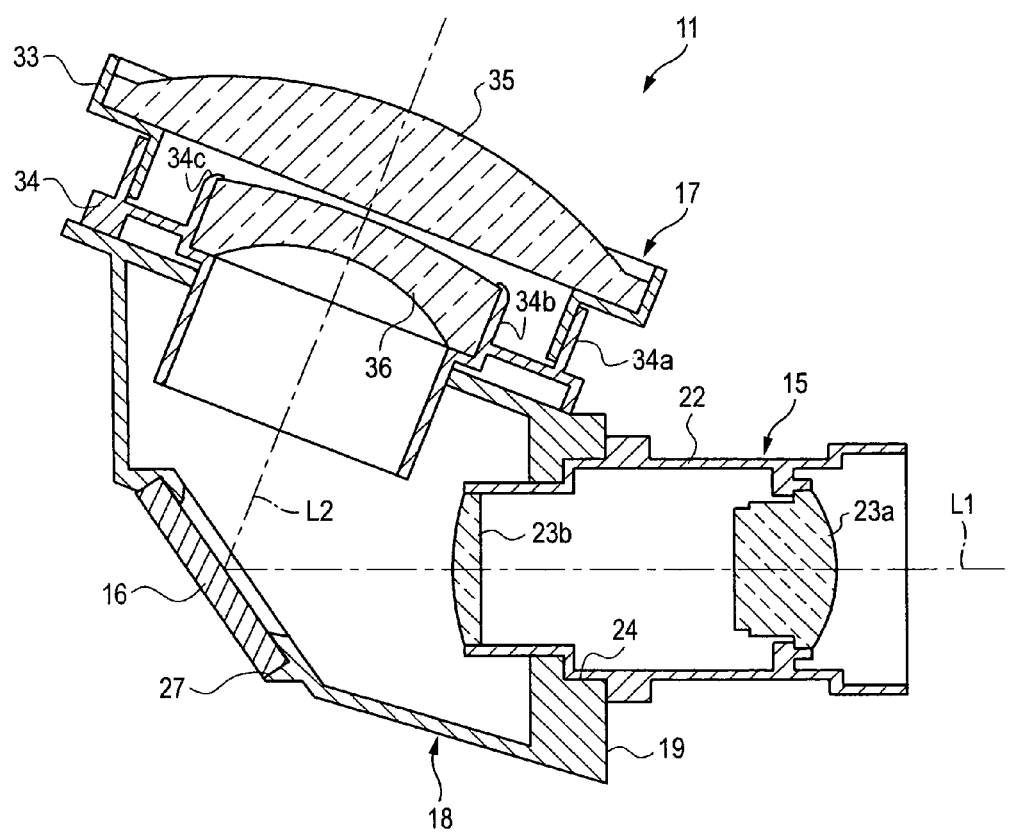
FIG. 1 is a sectional view showing a constitution of a projection lens unit.

A projection lens unit 11 shown in FIG. 1 constitutes an optical engine by being connected to an image reproducing unit. The optical engine is integrated to a rear projection apparatus or a front projection apparatus having a screen for projecting an image to the screen. The projection lens unit 11 is constituted by a convergent optical system 15, a mirror 16, a magnifying optical system 17, and a lens cabinet 18 for holding these. The lens cabinet 18 is formed of a plastic or a metal having a light blocking effect and is connected to an image generating unit (not illustrated) by a flange portion 19 to which the convergent optical system 15 is attached.

The convergent optical system 15 is constituted by a convergent lens barrel 22, and convergent lenses 23a and 23b held by the convergent lens barrel 22 and the convergent lens barrel 22 is fitted into an attaching hole 24 formed at the flange portion 19 of the lens cabinet 18. The convergent optical system 15 converges image light incident from the image generating unit and irradiates the image light to the mirror 16 along an optical axis L1.

The mirror is contained at inside of a mirror opening 27 formed at the lens cabinet 18. The mirror 16 reflects the image light incident from the convergent optical system 15 to be incident to the magnifying optical system 17 along an optical axis L2.

The magnifying optical system 17 is constituted by a first and a second magnifying lens barrels 33 and 34, and a first and a second magnifying lenses 35 and 36 respectively held by the magnifying lens barrels 33 and 34. The magnifying optical system 17 in which a rear end of the second magnifying lens barrel 34 is attached to be inserted into the lens cabinet 18 magnifies the image light incident along the optical axis L2 to project to a screen (not illustrated).

The first magnifying lens barrel 33 is constituted by substantially a circular cylinder shape having a step portion, and the first magnifying lens 35 is into contact with and fixed to the step portion. The second magnifying lens barrel 34 is constituted by a double circular cylinder shape, and the first magnifying lens barrel 33 is fitted to an outer circular cylinder 34*a* from a rear end thereof. Further, an inner circular cylinder 34*b* of the second magnifying lens barrel 34 includes a step portion, the second magnifying lens 36 is into contact with and fixed to the step portion. Further, the second magnifying lens 36 is smaller in diameter than the first magnifying lens 35.

Figure 2A:
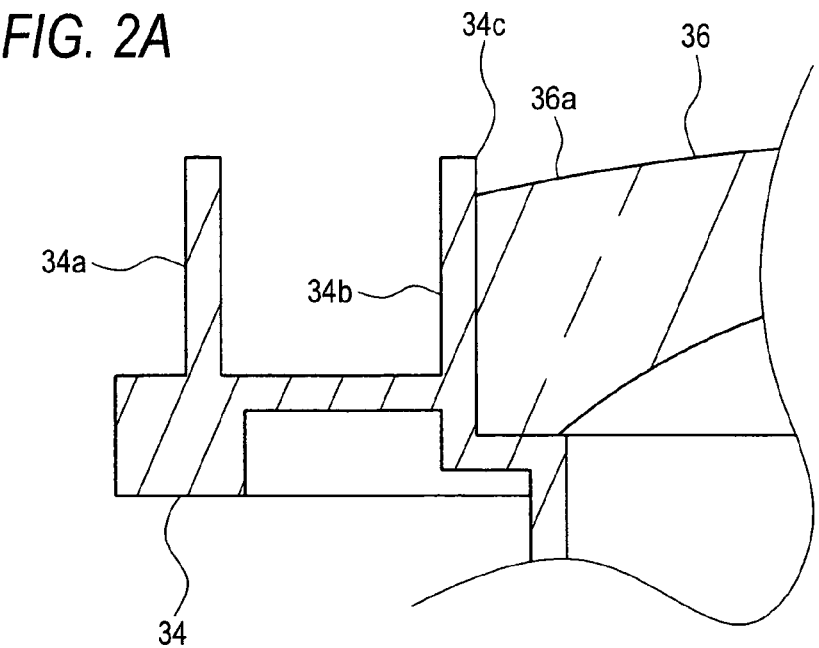
FIGS. 2A and 2B illustrate sectional views showing a constitution of a magnifying optical system.
Figure 2B:
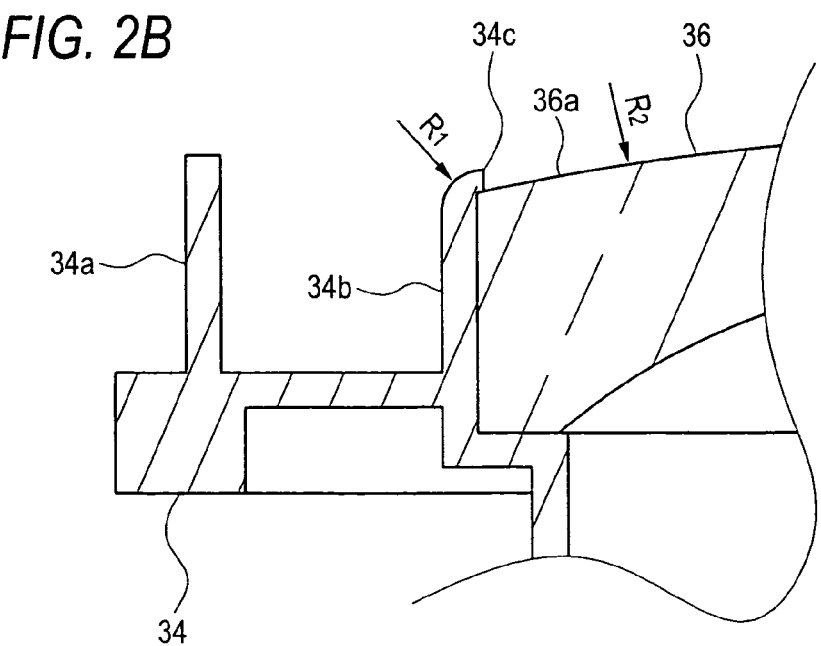
Figure 3:
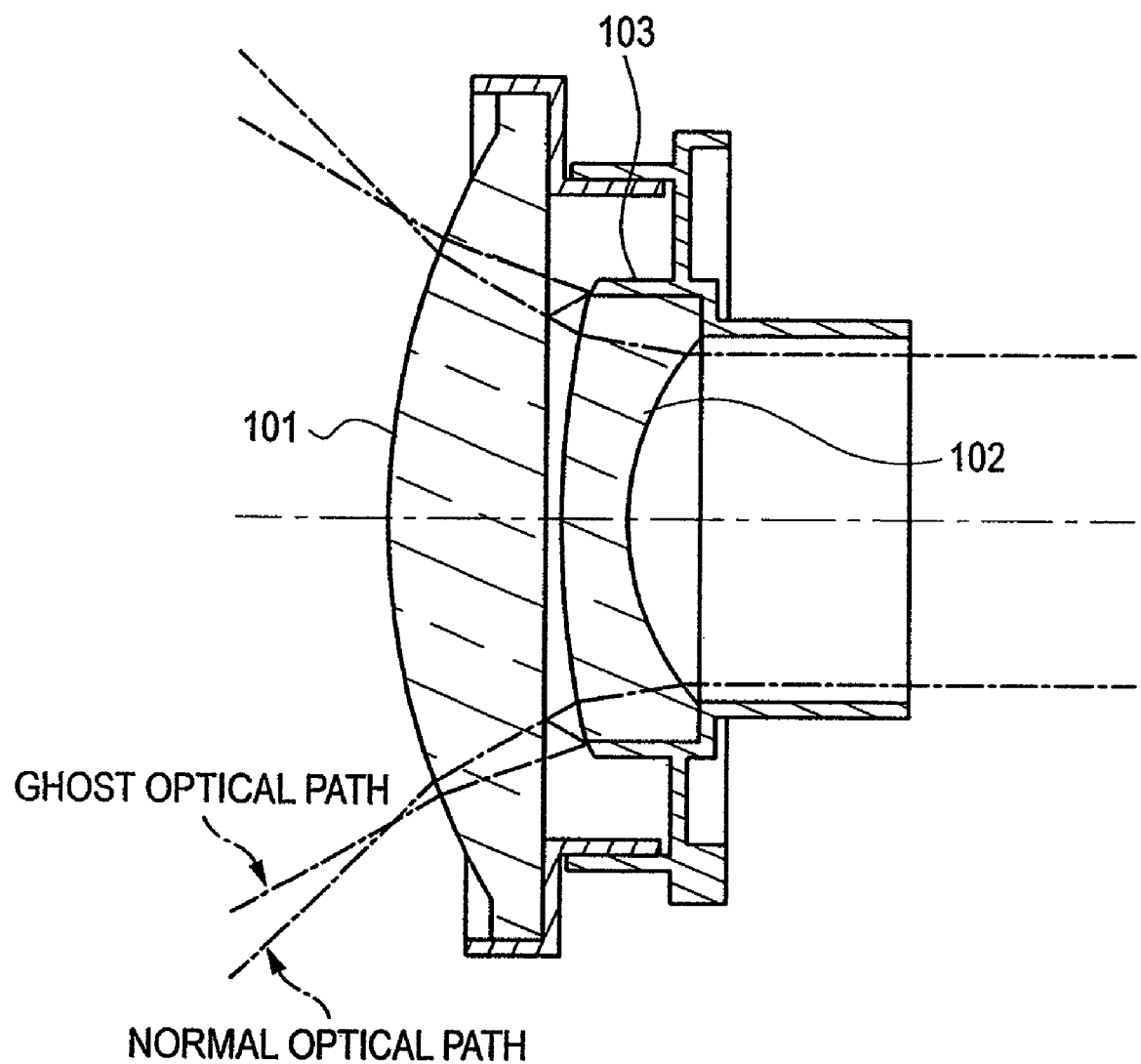
FIG. 3 is a sectional view showing a constitution of a magnifying optical system of a related art.

According to the magnifying optical system 17, in a manufacturing step, as shown by FIG. 2A, the second magnifying lens 36 is inserted into the inner circular cylinder 34*b* of the second magnifying lens barrel 34 to be into contact with the stepped portion. Further, as shown by FIG. 2B, a front end portion (caulking portion) 34*c* is plastically deformed by being heated and pressed and the second magnifying lens 36 is fixed thereto. Further, the thermal caulking method is well known and an explanation thereof will be omitted here.

By plastically deforming the front end portion 34*c* of the inner circular cylinder 34*b*, an outer peripheral edge thereof is chamfered to a curved surface. A radius of curvature $R_1$ provided to the curved surface of the front end portion 34*c* is smaller than a radius of curvature $R_2$ provided to a surface 36*a* of the second magnifying lens 36. Further, it is preferable that the radius of curvature $R_1$ provided to the curved surface of the front end portion 34*c* is equal to or smaller than 1/3 of the radius of curvature $R_2$ provided to the surface 36*a* of the second magnifying lens 36.

As described above, by constituting the front end portion 34*c* of the inner circular cylinder 34*b* of the second magnifying lens barrel 34 by the outer peripheral edge thereof being the curved surface and making the radius of curvature $R_1$ smaller than the radius of curvature $R_2$ provided to the surface 36*a* of the second magnifying lens 36, ghost is prevented from being generated at image light projected to a screen (not illustrated). This is because even when the image light reflected without transmitting through the first magnifying lens 35 is further reflected by the front end portion 34*c* of the inner circular cylinder 34*b* of the second magnifying lens barrel 34 holding the second magnifying lens 36 next to the first magnifying lens 35, only a small amount of the image light is incident on the first magnifying lens 35.

Further, by constituting the front end portion 34*c* of the inner circular cylinder 34*b* of the second magnifying lens barrel 34 by a rough surface, reflection of the image light by the front end portion 34*c* may be restrained and ghost may further be prevented from being generated.

Further, the shape of the curved surface of the front end portion 34*c* of the inner circular cylinder 34*b* may be formed by thermal caulking which has been widely used for fixing the second magnifying lens 36, and therefore, ghost may be prevented from being generated without separately increasing a manufacturing step and a part.

Further, although an explanation has been given of the embodiment by taking an example of a case of forming the shape of the curved surface of the front end portion 34*c* of the inner circular cylinder 34*b* by thermal caulking, the invention is not limited to thermal caulking.

Further, although an explanation has been given of the embodiment by taking an example of a case of forming the outer peripheral edge of the front end portion 34*c* of the inner circular cylinder 34*b* having the curved surface, the invention is not limited thereto but the outer peripheral edge may be constituted by a shape formed with numbers of recesses and projections in a circular ring shape.

Further, although an explanation has been given of the embodiment by taking an example of a case in which the magnifying optical system 17 includes two magnifying lenses 33 and 34, the magnifying optical system 17 may include, in order from the screen side, two magnifying lenses arranged in a descending order of a diameter, so the magnifying optical system 17 may include 3 or more magnifying lenses.

What is claimed is:

1. A projection lens unit comprising in order from a screen side:
   a first lens; and
   a second lens that is smaller in diameter than the first lens,
   wherein the second lens is held by an inner peripheral surface of a lens holding frame which has a shape of a circular cylinder,
   an end portion of the lens holding frame is a caulking portion that is plastically deformed by heat and pressure so the caulking portion directly caulks the second lens,
   an outer peripheral edge of the end portion of the lens holding frame on the screen side has a convex curved shape being smaller in radius of curvature than a screen-side surface of the second lens, said convex curved shape facing an inner face of said first lens.

2. The projection lens unit according to claim 1,
   wherein the convex curved surface is equal to or smaller than 1/3 in radius of curvature than the screen-side surface of the second lens.

3. The projection lens unit according to claim 1,
   wherein the end portion of the lens holding frame has a rough surface.

4. The projection lens unit according to claim 2,
   wherein the end portion of the lens holding frame has a rough surface.

5. A manufacturing method of a projection lens unit which comprises in order from a screen side, a first lens and a second lens smaller in diameter than the first lens, the second lens being held by an inner peripheral surface of a lens holding frame which has a shape of a circular cylinder, the fabrication method comprising:
   deforming plastically an end portion of the lens holding frame by heat and pressure so that the end portion is a caulking portion which directly caulks the second lens, and an outer peripheral edge of the end portion has a convex curved shape being smaller in radius of curvature than a screen-side surface of the second lens.

* * * * *